June 27, 1944.  E. M. HARVEY  2,352,197
AUTOMATIC VALVE
Filed Feb. 3, 1943
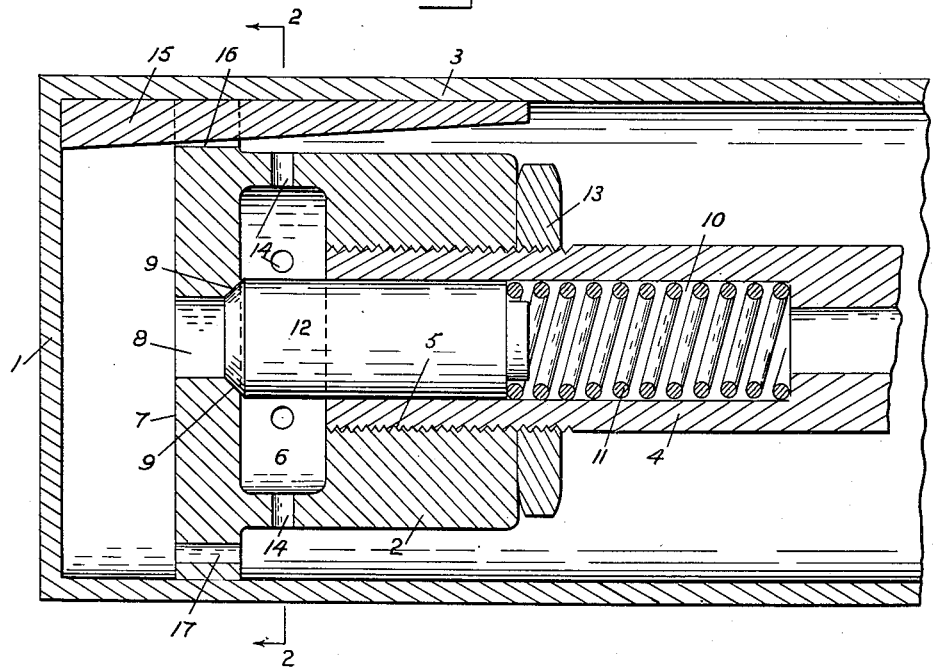
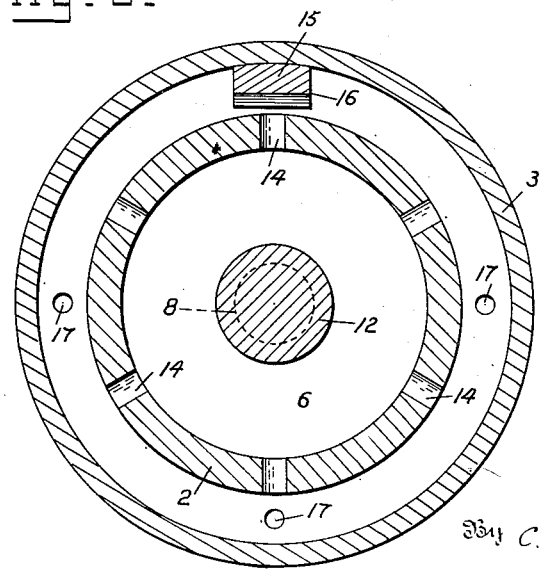
Inventor
Earle M. Harvey Patented June 27, 1944

2,352,197

UNITED STATES PATENT OFFICE 2,352,197

AUTOMATIC VALVE

Earle M. Harvey, Springfield, Mass.

Application February 3, 1943, Serial No. 474,529

1 Claim. (Cl. 103—225)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a valve for automatic compensation of variations in the viscosity of hydraulic fluid in a hydraulic buffer mechanism, particularly the type used for firearms.

Automatic firearms and particularly machine guns which utilize some form of hydraulic recoil buffer mechanism to ease the shock of recoiling members of such guns are generally very critical in operation when the hydraulic fluid used in the buffer mechanism changes appreciably in viscosity due to variations in the atmospheric temperature. This is especially true in machine guns used in aircraft. These hydraulic buffer mechanisms are usually adjusted to function properly at ground level. It is significant to note that the ground temperature at which aircraft machine guns are tuned up is relatively high as compared to the temperature of the substratosphere and these machine guns are expected to be operable at any altitude from ground level to the maximum ceiling of the plane. As it is well known that the viscosity of the hydraulic fluid increases as the air temperature decreases, it is apparent that any automatic firearm which employs a hydraulic fluid for the recoil mechanism will be greatly affected by appreciable variations in the viscosity of the fluid. A similar problem exists in any hydraulic system subject to appreciable viscosity variations.

Accordingly, it is an object of this invention to provide a valve for a hydraulic system which will automatically compensate for variations in the viscosity of the hydraulic fluid.

It is a particular object of this invention to provide an improved hydraulic recoil buffer mechanism for an automatic firearm which will automatically compensate for variations in the viscosity of the hydraulic fluid.

The specific nature of the invention as well as other objects and advantages thereof will clearly appear from a description of a preferred embodiment as shown in the accompanying drawing in which:

Fig. 1 is a partial longitudinal sectional view of a hydraulic cylinder embodying this invention showing the piston nearing the end of the recoil stroke.

Fig. 2 is a cross sectional view taken along the plane 2—2 of Fig. 1.

There is shown in Fig. 1 a hydraulic buffer mechanism 1 particularly adapted for a machine gun such as disclosed in U. S. Patent No. 1,628,226 to John M. Browning. A piston 2 is slidably mounted within the cylinder 3 of the buffer mechanism 1. A piston rod 4 is threadably secured within an axial threaded hole 5 in piston 2. A cylindrical axial cavity 6 is provided within the piston 2 a short distance from the front face 7 of piston 2. A small axial hole 8 thru the face 7 of piston 2 provides a passage or port to the cavity 6. A sharply chamfered surface 9 is provided on the interior edge of hole 8 adjacent the cavity 6. The piston rod 4 is provided with a longitudinal axial hole 10 to receive a valve spring 11 and a valve 12. The spring 11 biases valve 12 outwardly to permit the valve 12 to close the opening formed by hole 8. The forward end of valve 12 is of course suitably beveled to conform to the chamfered surface 9 in order to provide a tight seal.

The piston rod 4 may be secured to the barrel extension (not shown) of a machine gun. A check nut 13 surrounding the piston rod 4 may be provided to securely lock piston head 2 to piston rod 4. There are provided about the periphery of piston 2 six radial holes 14 which open into the cavity 6 for the purpose of permitting the hydraulic fluid to escape from cavity 6 as will be presently described. While the preferred form shows only six escape holes 14 any number of such holes may be provided as desired. A conventional throttling bar 15 may be suitably secured to the interior wall of cylinder 3 to assist in braking the rearward thrust of piston 2. A suitable slot 16 in head of piston 2 accommodates throttling bar 15.

The conventional piston has a solid head with the exception of one or more bypass holes. It is thus apparent that when the buffer mechanism is adjusted to function properly with a hydraulic fluid of a certain viscosity that fluid will flow thru the bypass holes 17 without difficulty. However, as the viscosity of this hydraulic fluid increases, such fluid would flow through the bypass holes much slower. The effect would be to slow the gun down to a point where it would be inoperative because the oil could not flow thru the bypass holes rapidly enough to permit proper functioning of the buffer mechanism. In other words the gun would not open sufficiently to permit the ejection of the fired case and the feeding of another cartridge.

Spring 11 is preloaded and the amount of preloading is such as to maintain the valve 12 closed thru a range of viscosity which does not impair the functioning of the machine gun or whatever apparatus the hydraulic mechanism is applied to. Upon further increase in viscosity, due to lower temperatures or other causes, the resistance of valve spring 11 is overcome by the pressure of the hydraulic fluid against the face of valve 12 and valve 12 will open slightly permitting a small amount of hydraulic fluid to enter cavity 6 and escape to the rear thru escape holes 14. When the pressure of the hydraulic fluid has thus been sufficiently reduced valve spring 11 biases valve 12 closed and the cycle of opening again is repeated. It is possible for this valve to open and close several times during the rearward movement of the piston thus braking the force of the recoil movement. The greater the viscosity the more valve 12 will open and hence the more rapid will be the escape of fluid. In case of very high viscosity valve 12 may remain open thru the entire stroke. On the counter-recoil stroke the hydraulic fluid is bypassed thru the throttling bar slot 16 in piston 2 to allow piston 2 to be returned to the battery position.

Thus it is readily apparent that a valve as described above will accommodate a wide variation in viscosity of a hydraulic fluid. As the rate of flow of the bypassed hydraulic fluid in the cylinder is automatically controlled by the automatic valve independently of its viscosity, the same cyclic rate of firing of the automatic firearm will be maintained as the resistance of the hydraulic buffer mechanism will be relatively constant.

I claim:

In a hydraulic mechanism, a reciprocating piston, a piston rod having a counterbored end portion threadably inserted in said piston, said piston having a by-pass opening, a cylindrical valve member movably mounted in said counterbored end portion of said piston rod and arranged to close said by-pass opening, a spring mounted within said counterbored end portion and operative between said valve member and the bottom surface of said counterbored portion, said spring biasing said valve member into closed position and a lock nut operative between said piston and said piston rod whereby the degree of insertion of said piston rod in said piston may be selected to yield a predetermined loading on said spring.

EARLE M. HARVEY.